(12) United States Patent
Chen et al.

(10) Patent No.: US 9,847,720 B2
(45) Date of Patent: Dec. 19, 2017

(54) SIDO POWER CONVERTER OPERABLE IN DISCONTINUOUS CONDUCTION MODE AND CONTROL METHOD THEREOF

(71) Applicant: ANPEC ELECTRONICS CORPORATION, Hsinchu (TW)

(72) Inventors: Chih-Yuan Chen, Hsinchu (TW); Tzu-Yang Yen, Taipei (TW)

(73) Assignee: ANPEC ELECTRONICS CORPORATION, Hsinchu (TW)

( * ) Notice: Subject to any disclaimer, the term of this patent is extended or adjusted under 35 U.S.C. 154(b) by 68 days.

(21) Appl. No.: 14/953,389

(22) Filed: Nov. 29, 2015

(65) Prior Publication Data

US 2017/0033689 A1 Feb. 2, 2017

(30) Foreign Application Priority Data

Jul. 31, 2015 (TW) .............................. 104124918 A

(51) Int. Cl.
*H02M 3/158* (2006.01)
*H02M 1/00* (2006.01)

(52) U.S. Cl.
CPC ......... *H02M 3/158* (2013.01); *H02M 3/1582* (2013.01); *H02M 2001/0009* (2013.01); *H02M 2001/0032* (2013.01)

(58) Field of Classification Search
CPC .. H02M 3/158; H02M 3/1582; H02M 3/1588; H02M 3/156; Y02B 70/1466
See application file for complete search history.

(56) References Cited

U.S. PATENT DOCUMENTS

2014/0218117 A1* 8/2014 Branca ............... H02M 3/156 330/297

* cited by examiner

*Primary Examiner* — Nguyen Tran
*Assistant Examiner* — Monica Mata
(74) *Attorney, Agent, or Firm* — Li & Cai Intellectual Property (USA) Office

(57) ABSTRACT

Provided herein are a single-inductor dual-output (SIDO) power converter operable in a discontinuous conduction mode and a control method thereof. The SIDO power converter is operable to switch between a boost mode and a buck-boost mode. The SIDO power converter dynamically adjusts output timings of clock signals with respect to the loads according to a load difference therebetween to lower the power consumption with a light load when the inductor current is zero to achieve optimal power distribution.

16 Claims, 14 Drawing Sheets

SIDO POWER CONVERTER OPERABLE IN DISCONTINUOUS CONDUCTION MODE AND CONTROL METHOD THEREOF

BACKGROUND

1. Technical Field

The present invention generally relates to a single-inductor dual-output (SIDO) power converter operable in a discontinuous conduction mode (DCM) and, more particularly, to a SIDO power converter and a control method thereof, capable of dynamically adjusting the phases of clock signals with respect to the loads according to a load difference therebetween to achieve optimal power distribution.

2. Description of Related Art

With the development of technology, single electronic devices have evolved to provide multiple functions. Therefore, it is crucial to provide a power converter capable of supplying multiple voltage levels to meet the requirements of the multiple functions of the electronic device. A single-inductor dual-output (SIDO) power converter, in which only one inductor element is used to provide two output voltage levels, is a proper candidate with minimal size, low cost and high conversion efficiency.

Referring to FIG. 1, FIG. 1 is a circuit diagram of a conventional SIDO power converter. More particularly, the SIDO power converter 1 includes an inductor L, a first switch $SW_1$, a second switch $SW_2$, diodes 10, 12, capacitors 14, 16, and a pulse width modulation (PWM) control circuit 18. The PWM control circuit 18 controls the first switch $SW_1$ and the second switch $SW_2$, respectively, to be turned on or off so that the SIDO power converter 1 is capable of providing two different output voltage levels $V_{SP}$, $V_{SN}$. The SIDO power converter 1 further operates in a discontinuous conduction mode to prevent cross regulation. Therefore, the SIDO power converter 1 is configured to switch between a boost mode and a buck-boost mode. In other words, the SIDO power converter 1 operates alternately in the boost mode and the buck-boost mode. Once the inductor L finishes storing and releasing energy in the boost mode, the inductor L is switched to operate in the buck-boost mode to recharge the output capacitor.

Referring to FIG. 2, FIG. 2 illustrates the waveform when the SIDO power converter FIG. 1 operates. The waveform 20 indicates the change of the inductor current IL, where T1 is the cycle of the boost mode, T2 is the cycle of the buck-boost mode, and each of the cycle T1 and the cycle T2 includes an idle period $T1_{IDL}$ and $T2_{IDL}$, respectively, when the inductor current IL is zero. Accordingly, since the switching between the boost mode and the buck-boost mode remains at a constant frequency (i.e., T1=T2), the buck-boost mode with the longer idle period $T2_{IDL}$ exhibits lower power conversion efficiency and larger power loss.

SUMMARY

One embodiment of the present invention provides a SIDO power converter operable in a discontinuous conduction mode. The SIDO power converter includes an output circuit, an error amplifier circuit, a current sensing circuit, a constant-frequency clock generator circuit, a clock adjustment circuit and a PWM logic control circuit. The output circuit includes a first output terminal, a second output terminal, an inductor, a first switching transistor and a second switching transistor. The first switching transistor and the second switching transistor are controlled by a first control signal and a second control signal, respectively, to determine whether the first switching transistor and the second switching transistor are turned on or off so as to generate a first output voltage and a second output voltage. The error amplifier circuit is coupled to the first output terminal and the second output terminal, and compares the first output voltage and the second output voltage, respectively, with a first reference voltage and a second reference voltage so as to generate a first load value and a second load value. The current sensing circuit is coupled to the output circuit to acquire an inductor current as a sensed value when the first switching transistor and the second switching transistor are both turned on. The constant-frequency clock generator circuit generates a first reference clock signal and a second reference clock signal with a constant phase difference of 180 degrees therebetween. The clock adjustment circuit is coupled to the error amplifier circuit and the constant-frequency clock generator circuit and determines whether the first reference clock signal and the second reference clock signal are to be adjusted according to a difference value between the first load value and the second load value so as to generate a first output clock signal and a second output clock signal. The PWM logic control circuit is coupled to the output circuit, the error amplifier circuit, the clock adjustment circuit and the current sensing circuit, and generates the first control signal and the second control signal, respectively, according to the first load value, the second load value, the first output clock signal, the second output clock signal and the sensed value so as to control the first switching transistor and the second switching transistor to be turned on or off.

Preferably, the SIDO power converter is operable in a peak-current control mode.

One embodiment of the present invention further provides a method for controlling a SIDO power converter operable in a discontinuous conduction mode. The SIDO power converter is implemented as previously stated. The method includes steps herein. The error amplifier circuit compares the first output voltage and the second output voltage, respectively, with a first reference voltage and a second reference voltage so as to generate a first load value and a second load value. The current sensing circuit acquires an inductor current as a sensed value when the first switching transistor and the second switching transistor are both turned on. The constant-frequency clock generator circuit generates a first reference clock signal and a second reference clock signal with a constant phase difference of 180 degrees therebetween. The clock adjustment circuit determines whether the first reference clock signal and the second reference clock signal are to be adjusted according to a difference value between the first load value and the second load value so as to generate a first output clock signal and a second output clock signal. The PWM logic control circuit generates the first control signal and the second control signal, respectively, according to the first load value, the second load value, the first output clock signal, the second output clock signal and the sensed value so as to control the first switching transistor and the second switching transistor to be turned on or off.

Another embodiment of the present invention further provides a SIDO power converter operable in a discontinuous conduction mode. The SIDO power converter includes an output circuit, an error amplifier circuit, a current sensing circuit, a constant-frequency clock generator circuit, a clock adjustment circuit and a PWM logic control circuit. The output circuit includes a first output terminal, a second output terminal, an inductor, a first switching transistor and a second switching transistor. The first switching transistor and the second switching transistor are controlled by a first control signal and a second control signal, respectively, to determine whether the first switching transistor and the second switching transistor are turned on or off so as to generate the first output voltage and the second output voltage. The error amplifier circuit is coupled to the first output terminal and the second output terminal, and compares the first output voltage and the second output voltage, respectively, with a first reference voltage and a second reference voltage so as to generate a first load value and a second load value. The current sensing circuit is coupled to the output circuit to acquire an inductor current as a first sensed value when the first switching transistor is turned on and the second switching transistor is turned off and an inductor current as a second sensed value when the first switching transistor is turned off and the second switching transistor is turned on. The constant-frequency clock generator circuit generates a first reference clock signal and a second reference clock signal with a constant phase difference of 180 degrees therebetween. The clock adjustment circuit is coupled to the current sensing circuit and the constant-frequency clock generator circuit and determines whether the first reference clock signal and the second reference clock signal are to be adjusted according to a difference value between the first sensed value and the second sensed value so as to generate a first output clock signal and a second output clock signal. The PWM logic control circuit is coupled to the output circuit, the error amplifier circuit and the clock adjustment circuit, and generates the first control signal and the second control signal, respectively, according to the first load value, the second load value, the first output clock signal, the second output clock signal and a ramp waveform based on an internal clock so as to control the first switching transistor and the second switching transistor to be turned on or off.

Preferably, the SIDO power converter is operable in a voltage control mode.

Another embodiment of the present invention further provides a method for controlling a SIDO power converter operable in a discontinuous conduction mode. The SIDO power converter is implemented as previously stated. The method includes steps herein. The error amplifier circuit compares the first output voltage and the second output voltage, respectively, with a first reference voltage and a second reference voltage so as to generate a first load value and a second load value. The current sensing circuit acquires an inductor current as a first sensed value when the first switching transistor is turned on and the second switching transistor is turned off and an inductor current as a second sensed value when the first switching transistor is turned off and the second switching transistor is turned on. The constant-frequency clock generator circuit generates a first reference clock signal and a second reference clock signal with a constant phase difference of 180 degrees therebetween. The clock adjustment circuit determines whether the first reference clock signal and the second reference clock signal are to be adjusted according to a difference value between the first sensed value and the second sensed value so as to generate a first output clock signal and a second output clock signal. The PWM logic control circuit generates the first control signal and the second control signal, respectively, according to the first load value, the second load value, the first output clock signal, the second output clock signal and a ramp waveform based on an internal clock so as to control the first switching transistor and the second switching transistor to be turned on or off.

As stated above, the present invention provides a SIDO power converter operable in a discontinuous conduction mode and a control method thereof, capable of dynamically adjusting the phases of clock signals with respect to the loads according to a load difference therebetween to achieve optimal power distribution.

In order to further understand the techniques, means and effects of the present disclosure, the following detailed descriptions and appended drawings are hereby referred to, such that, and through which, the purposes, features and aspects of the present disclosure can be thoroughly and concretely appreciated; however, the appended drawings are merely provided for reference and illustration, without any intention to be used for limiting the present disclosure.

BRIEF DESCRIPTION OF THE DRAWINGS

The accompanying drawings are included to provide a further understanding of the present disclosure, and are incorporated in and constitute a part of this specification. The drawings illustrate exemplary embodiments of the present disclosure and, together with the description, serve to explain the principles of the present disclosure.

DESCRIPTION OF THE EXEMPLARY EMBODIMENTS

The detailed description set forth below in connection with the appended drawings is intended as a description of certain embodiments of the present disclosure, and is not intended to represent the only forms that may be developed or utilized. The description sets forth the various functions in connection with the illustrated embodiments, but it is to be understood, however, that the same or equivalent functions may be accomplished by different embodiments that are also intended to be encompassed within the scope of the present disclosure.

Figure 3:
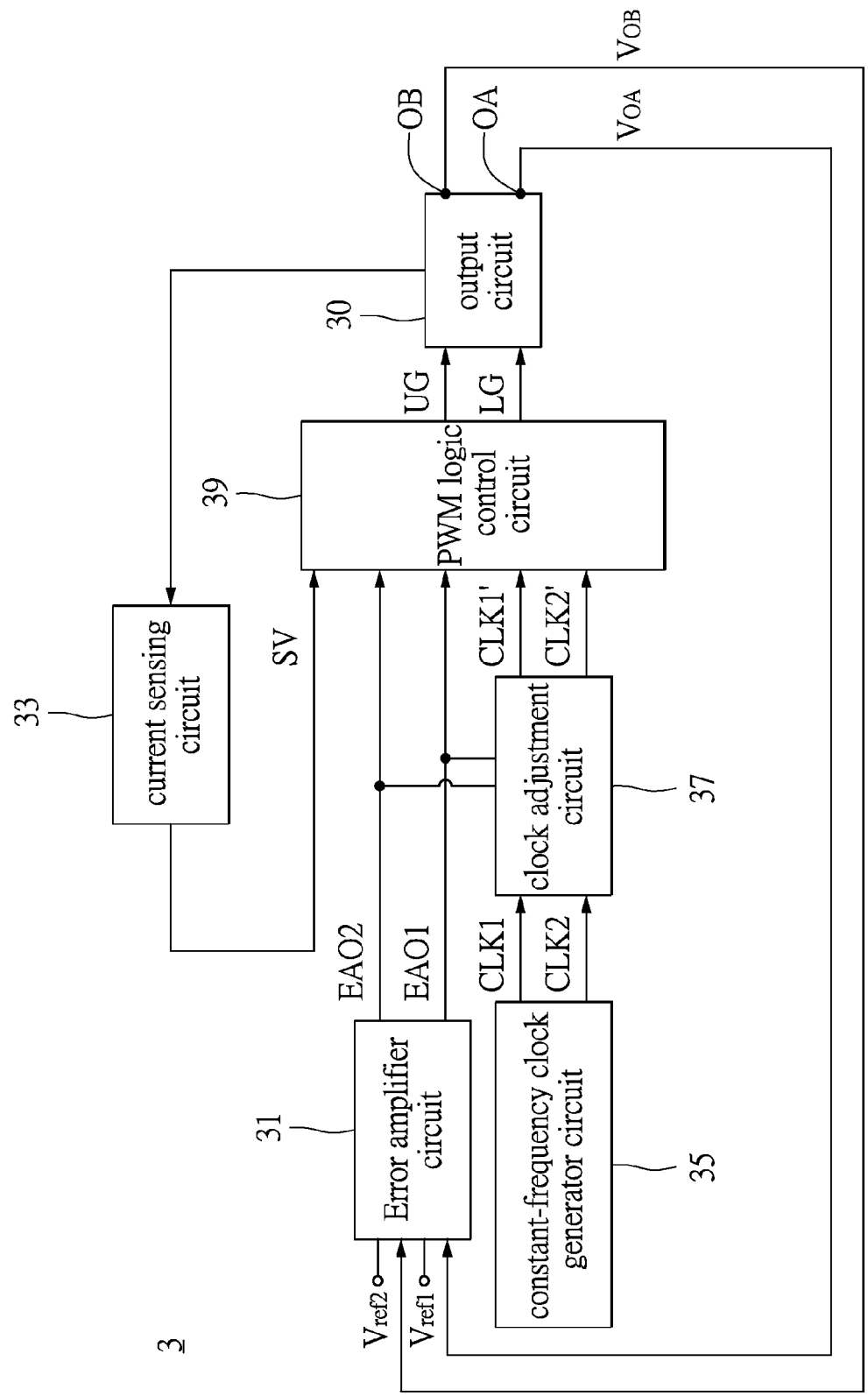
FIG. 3 is a block diagram of a SIDO power converter operable in a discontinuous conduction mode according to one embodiment of the present invention.

First, referring to FIG. 3, FIG. 3 is a block diagram of a SIDO power converter operable in a discontinuous conduction mode according to one embodiment of the present invention. The SIDO power converter 3 includes an output circuit 30, an error amplifier circuit 31, a current sensing circuit 33, a constant-frequency clock generator circuit 35, a clock adjustment circuit 37 and a PWM logic control circuit 39. These elements in the SIDO power converter 3 can be implemented by hardware circuitry, or by hardware circuitry with firmware or with software. Accordingly, the present invention is not limited to the previous example of the SIDO power converter 3. Moreover, the output circuit 30, the error amplifier circuit 31, the current sensing circuit 33, the constant-frequency clock generator circuit 35, the clock adjustment circuit 37 and the PWM logic control circuit 39 can be integrated or discretely installed, to which the present invention is not limited.

Figure 4:
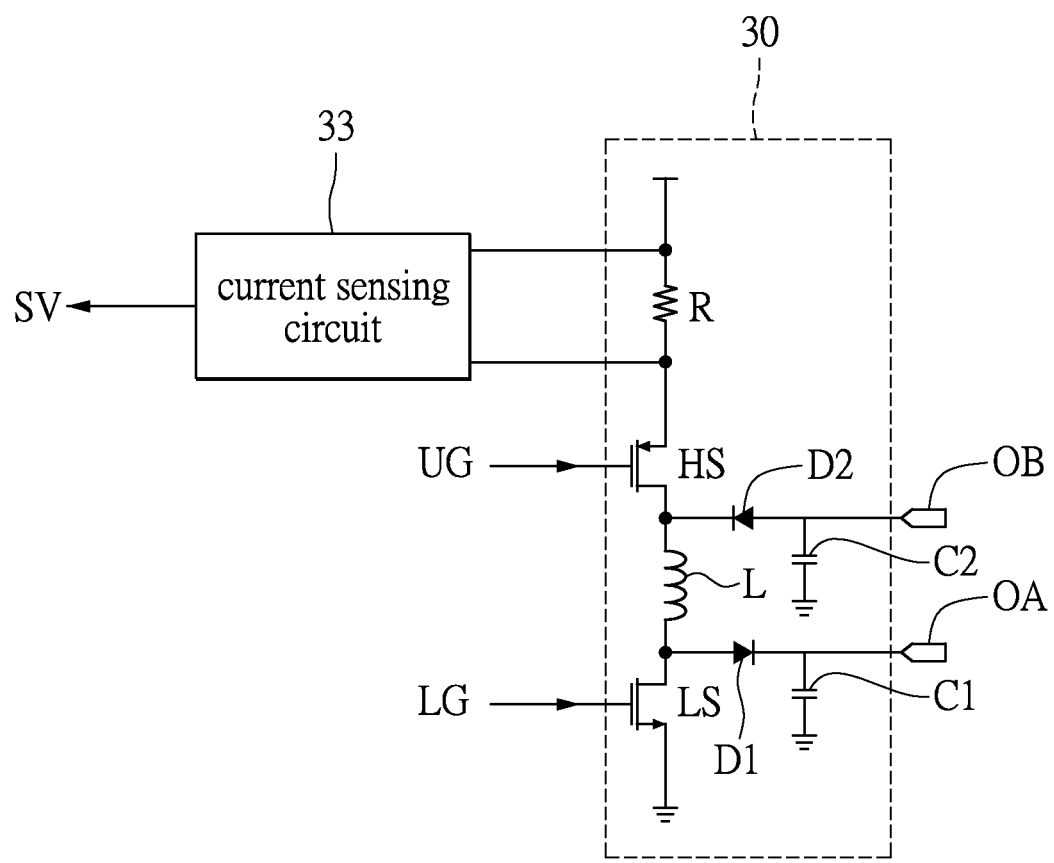
FIG. 4 is a circuit diagram of an output circuit of the SIDO power converter in FIG. 3.

Referring to FIG. 4, FIG. 4 is a circuit diagram of an output circuit of the SIDO power converter in FIG. 3. Some elements in FIG. 4 are labeled in the same manner as in FIG. 3, and descriptions thereof are not repeated herein. More particularly, the output circuit 30 includes a first output terminal OA and a second output terminal OB for outputting a first output voltage $V_{OA}$ and a second output voltage $V_{OB}$, respectively. Moreover, the output circuit 30 further includes an inductor L, a first switching transistor LS and a second switching transistor HS. The first switching transistor LS and the second switching transistor HS are controlled by a first control signal LG and a second control signal UG, respectively, to determine whether the first switching transistor LS and the second switching transistor HS are turned on or off so as to generate a first output voltage $V_{OA}$ and a second output voltage $V_{OB}$. Practically, the first switching transistor LS may be an N-channel metal-oxide-semiconductor field-effect transistor (N-channel MOSFET, NMOS), and the second switching transistor HS may be a P-channel metal-oxide-semiconductor field-effect transistor (P-channel MOSFET, PMOS), to which the present invention is not limited.

On the other hand, the output circuit 30 may further include a first diode D1, a second diode D2, a first output capacitor C1 and a second output capacitor C2. The first diode D1 is coupled between the drain of the first switching transistor LS and the first output terminal OA. The second diode D2 is coupled between the drain of the second switching transistor HS and the second output terminal OB. The first output capacitor C1 is coupled between the first output terminal OA and the grounding terminal GND. The second output capacitor C2 is coupled between the second output terminal OB and the grounding terminal GND. Therefore, in view of the above, a person with ordinary skill in the art should understand that the SIDO power converter 3 may be configured to switch between a boost mode (i.e., the first output terminal OA) and a buck-boost mode (i.e., the second output terminal OB). It should be noted that the configuration of the output circuit 30 is known to a person with ordinary skill in the art and the detailed description thereof is not repeated herein. In short, the embodiment as shown in FIG. 4 is only an example of an output circuit 30 of the SIDO power converter 3. The present invention is not limited to the example of the output circuit 30. A person of ordinary skill in the art may make any modifications according to practical demands.

Referring back to FIG. 3, the error amplifier circuit 31 is coupled to the first output terminal OA and the second output terminal OB, and compares the first output voltage $V_{OA}$ and the second output voltage $V_{OB}$, respectively, with a first reference voltage $V_{ref1}$ and a second reference voltage $V_{ref2}$ so as to generate a first load value EAO1 and a second load value EAO2. The current sensing circuit 33 is coupled to the output circuit 30 to acquire an inductor current IL as a sensed value SV when the first switching transistor LS and the second switching transistor HS are both turned on.

Moreover, the constant-frequency clock generator circuit 35 generates a first reference clock signal CLK1 and a second reference clock signal CLK2 with a constant phase difference of 180 degrees therebetween. The clock adjustment circuit 37 is coupled to the error amplifier circuit 31 and the constant-frequency clock generator circuit 35 and determines whether the first reference clock signal CLK1 and the second reference clock signal CLK2 are to be adjusted according to a difference value (for example, EAO1−EAO2) between the first load value EAO1 and the second load value EAO2 so as to generate a first output clock signal CLK1' and a second output clock signal CLK2'. Then, the PWM logic control circuit 39 is coupled to the output circuit 30, the error amplifier circuit 31, the clock adjustment circuit 37 and the current sensing circuit 33, and generates the first control signal LG and the second control signal UG, respectively, according to the first load value EAO1, the second load value EAO2, the first output clock signal CLK1', the second output clock signal CLK2' and the sensed value SV so as to control the first switching transistor LS and the second switching transistor HS to be turned on or off.

Figure 2:
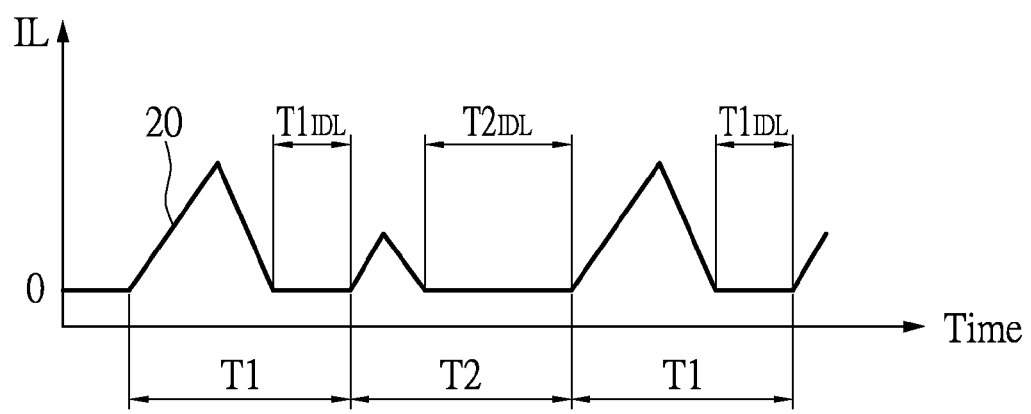
FIG. 2 illustrates the waveform when the SIDO power converter in FIG. 1 operates.

As previously stated, the SIDO power converter 3 is a closed loop system operable in a discontinuous conduction mode. The first output terminal OA is a heavy load (for example, the boost mode as shown in FIG. 4) and the second output terminal OB is a light load (for example, the buck-boost mode as shown in FIG. 4). The switching between the boost mode and the buck-boost mode remains at a constant frequency (for example, the phase difference between the first reference clock signal CLK1 and the second reference clock signal CLK2 is 180 degrees). Once the inductor L finishes storing and releasing energy, the idle period when the inductor current IL remains zero (for example, $T2_{IDL}$ in FIG. 2) is relatively too long, resulting in larger power loss. In view of the above, the SIDO power converter 3 of the present invention is characterized in that it is capable of dynamically adjusting output timings of clock signals with respect to the loads according to a load difference therebetween to lower the power consumption with a light load when the inductor current is zero to achieve optimal power distribution.

On the other hand, whether the SIDO power converter 3 operates in the buck-boost mode or in the boost mode, the PWM logic control circuit 39 controls both the first switching transistor LS and the second switching transistor HS to be turned on to increase the inductor current IL when energy is being stored. Therefore, when the inductor current IL increases to a threshold, the PWM logic control circuit 39 switches the first switching transistor LS or the second switching transistor HS to be turned off so as to release energy and avoid energy overload. In view of the above, the SIDO power converter 3 of the present invention is further characterized in that it is capable of acquiring, by the current sensing circuit 33 coupled to the output circuit 30, an inductor current IL as a sensed value SV when the first switching transistor LS and the second switching transistor HS are both turned on. Accordingly, the PWM logic control circuit 39 determines whether the inductor current IL reaches the threshold according to the sensed value SV and switches the first switching transistor LS or the second switching transistor HS corresponding thereto to be turned off. Therefore, in view of the above, a person with ordinary skill in the art should understand that the SIDO power converter 3 is operable in a peak-current control mode.

Figure 5:
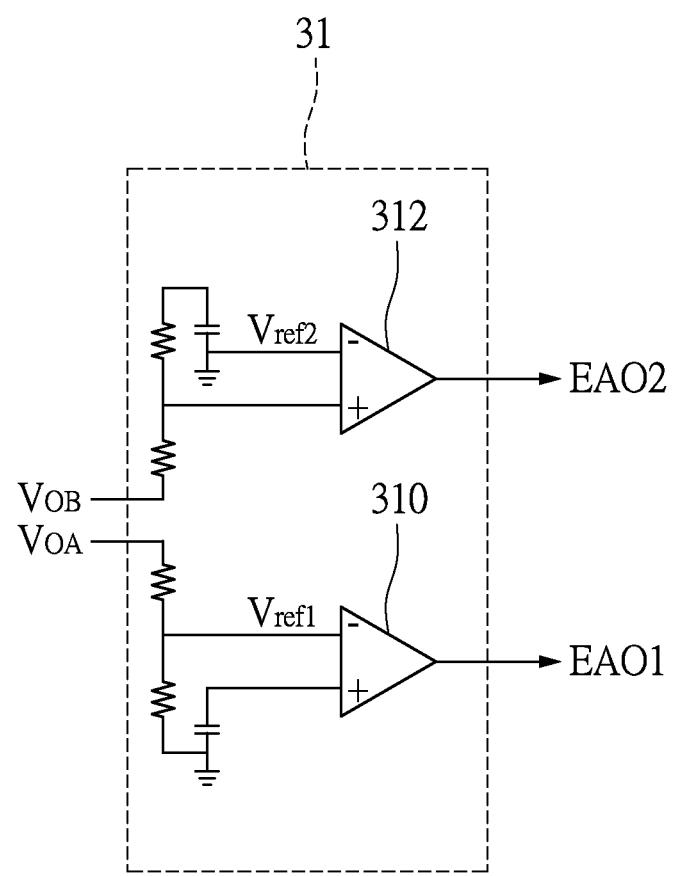
FIG. 5 is a circuit diagram of an error amplifier circuit of the SIDO power converter in FIG. 3.

To further describe the error amplifier circuit 31 of the SIDO power converter 3 in detail, please refer to FIG. 5, which is a circuit diagram of an error amplifier circuit of the SIDO power converter in FIG. 3. However, provided herein is only an example of the error amplifier circuit 31 of the SIDO power converter 3, to which the present invention is not limited. Moreover, the error amplifier circuit 31 may also be operable with the SIDO power converter 3 in FIG. 3. Therefore, please also refer to FIG. 3 for better understanding. Some elements in FIG. 5 are labeled in the same manner as in FIG. 3, and descriptions thereof are not repeated herein.

More particularly, the error amplifier circuit 31 may include two comparators 310, 312 to feedback the ripples of the first output voltage $V_{OA}$ and the second output voltage $V_{OB}$ to the comparator 310 and the comparator 312, respectively. Moreover, the comparators 310, 312 compare the ripples with the first reference voltage $V_{ref1}$ and the second reference voltage $V_{ref2}$, respectively, all the time to generate the first load value EAO1 and the second load value EAO2. It should be noted that the configuration of the error amplifier circuit 31 is known to a person with ordinary skill in the art and the detailed description thereof is not repeated herein. In short, in view of the above, a person with ordinary skill in the art should understand that the output of the error amplifier circuit 31 of the SIDO power converter 3 in the present embodiment may be referred to for determining the difference of the two loads.

For example, referring back to FIG. 3, under ideal circumstances, if the first output terminal OA and the second output terminal OB are both in the boost mode (or the buck-boost mode) and supply identical voltages, the first load value EAO1 and the second load value EAO2 outputted by the error amplifier circuit 31 are also identical. Therefore, the difference value between the first load value EAO1 and the second load value EAO2 equals zero. In other words, the switching between the boost mode and the buck-boost mode remains at a constant frequency. Therefore, the clock adjustment circuit 37 does not have to adjust the phase difference between the first reference clock signal CLK1 and the second reference clock signal CLK2, and outputs the first reference clock signal CLK1 and the second reference clock signal CLK2 as a first output clock signal CLK1' and a second output clock signal CLK2', respectively.

On the other hand, in FIG. 4 for example, when the first output terminal OA is in the boost mode and the second output terminal OB is in the buck-boost mode, the first load value EAO1 outputted by the error amplifier circuit 31 exceeds the second load value EAO2 so that the difference value between the first load value EAO1 and the second load value EAO2 is larger than zero. Therefore, the clock adjustment circuit 37 adjusts the phase difference between the first reference clock signal CLK1 and the second reference clock signal CLK2 to generate the first output clock signal CLK1' and the second output clock signal CLK2' with a phase difference larger than 180 degrees. In other words, when the SIDO power converter 3 of the present invention determines that the first output terminal OA is a heavy load and the second output terminal OB is a light load, the clock adjustment circuit 37 outputs the first output clock signal CLK1' and the second output clock signal CLK2' with a larger phase difference so that once the second output terminal OB being a light load finishes releasing energy, the first output terminal OA may start to store energy after an idle period shorter than the previous period.

Figure 1:
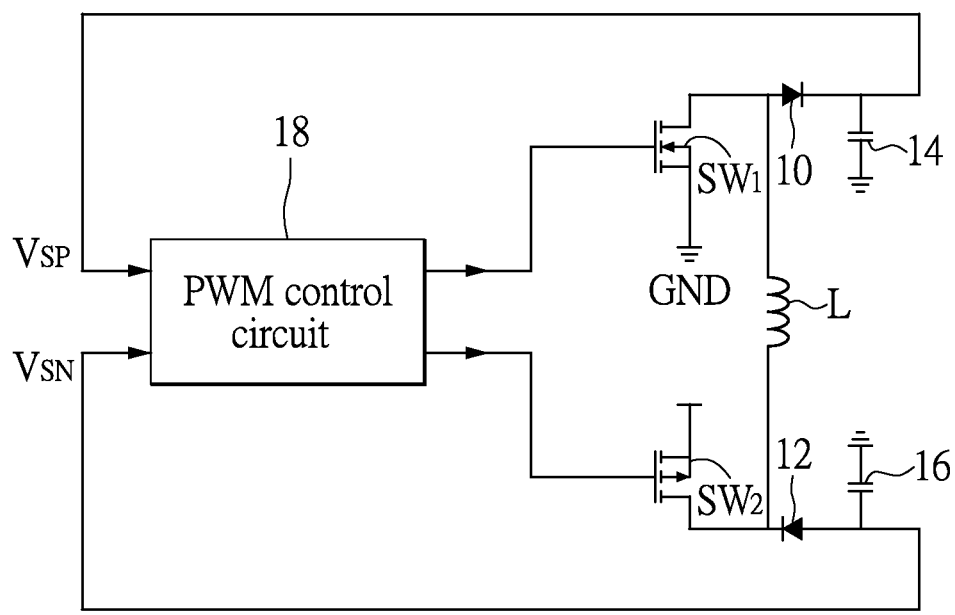
FIG. 1 is a circuit diagram of a conventional SIDO power converter.
Figure 6:
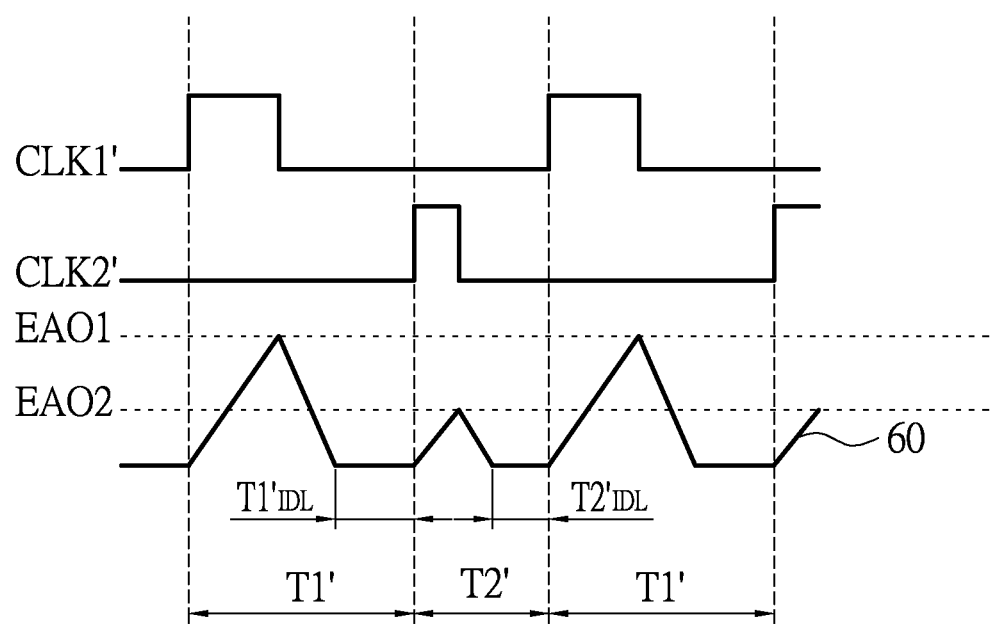
FIG. 6 illustrates the waveform when a SIDO power converter according to one embodiment of the present invention operates in a discontinuous conduction mode.

For example, referring to FIG. 6, FIG. 6 illustrates the waveform when a SIDO power converter according to one embodiment of the present invention operates in a discontinuous conduction mode. The waveform 60 represents the variation of the inductor current IL. T1' is a cycle for a heavy load (for example, the boost mode), T2' is a cycle for a light load (for example, the buck-boost mode), and T1'$_{IDL}$ and T2'$_{IDL}$ are idle periods in each of the cycles T1 and T2 when the inductor current IL is zero. Accordingly, compared to the conventional SIDO power converter in FIG. 1, the SIDO power converter 3 of the present invention is capable of shortening the idle period T2'$_{IDL}$ when the inductor current IL with a light load equals zero so as to reduce unnecessary power consumption and achieve optimal power distribution.

Accordingly, a person with ordinary skill in the art may use other methods for adjusting the phase difference between the first reference clock signal CLK1 and the second reference clock signal CLK2. For example, the clock adjustment circuit 37 may advance outputting each of pulses in the first reference clock signal CLK1 corresponding to each of pulses of the second reference clock signal CLK2, or delay outputting each of pulses in the second reference clock signal CLK2 corresponding to each of pulses of the first reference clock signal CLK1, or both. In short, the present invention is not limited to the previous examples of the method for adjusting the phase difference between the first reference clock signal CLK1 and the second reference clock signal CLK2. A person with ordinary skill in the art may make any modifications according to practical demands.

It should also be noted that, since the load in the buck-boost mode is lighter than the load in the boost mode, the time for turning on both the first switching transistor LS and the second switching transistor HS in the buck-boost mode is shorter than the time for turning on both the first switching transistor LS and the second switching transistor HS in the boost mode time. In other words, the pulse width in the second output clock signal CLK2' is much smaller than the pulse width in the first output clock signal CLK1', as shown in FIG. 6. However, the present invention is not characterized in the pulse width in the output clock signals, thus descriptions of the output clock signals are not repeated herein.

On the contrary, when first output terminal OA is in a buck-boost mode and the second output terminal OB is in a boost mode, the first load value EAO1 outputted by the error amplifier circuit 31 is smaller than the second load value EAO2. Therefore, the difference value between the first load value EAO1 and the second load value EAO2 is smaller than zero. Accordingly, the clock adjustment circuit 37 adjusts the phase difference between the first reference clock signal CLK1 and the second reference clock signal CLK2 to generate the first output clock signal CLK1' and the second output clock signal CLK2' with a phase difference smaller than 180 degrees. In other words, when the SIDO power converter 3 of the present invention determines that the first output terminal OA is a light load and the second output terminal OB is a heavy load, the clock adjustment circuit 37 outputs the first output clock signal CLK1' and the second output clock signal CLK2' with a smaller phase difference so that once the first output terminal OB being a light load finishes releasing energy, the second output terminal OB may start to store energy after an idle period shorter than the previous period. In short, the present invention is not limited to the previous examples of the clock adjustment circuit 37. A person of ordinary skill in the art may make any modifications according to practical demands.

Furthermore, as previously stated, the current sensing circuit 33 is characterized in that the inductor current IL when the first switching transistor LS and the second switching transistor HS are both turned on is acquired as a sensed value SV. Accordingly, a person with ordinary skill in the art may use other methods for implementing the current sensing circuit 33. For example, the current sensing circuit 33 may be coupled to the first switching transistor LS, the second switching transistor HS, the inductor L or any element capable of acquiring the inductor current when storing energy. Furthermore, for the sake of convenience, the current sensing circuit 33 may be coupled to two terminals of a resistor R connected in series to the first switching transistor LS (or the second switching transistor HS) to sense a value of a voltage across the resistor R to acquire the sensed value SV, as shown in FIG. 4, when the first switching transistor LS and the second switching transistor HS are both turned on. It should be noted that the current sensing circuit 33 in FIG. 4 is only an example thereof, to which the present invention is not limited. A person of ordinary skill in the art may make any modifications according to practical demands.

Figure 7:
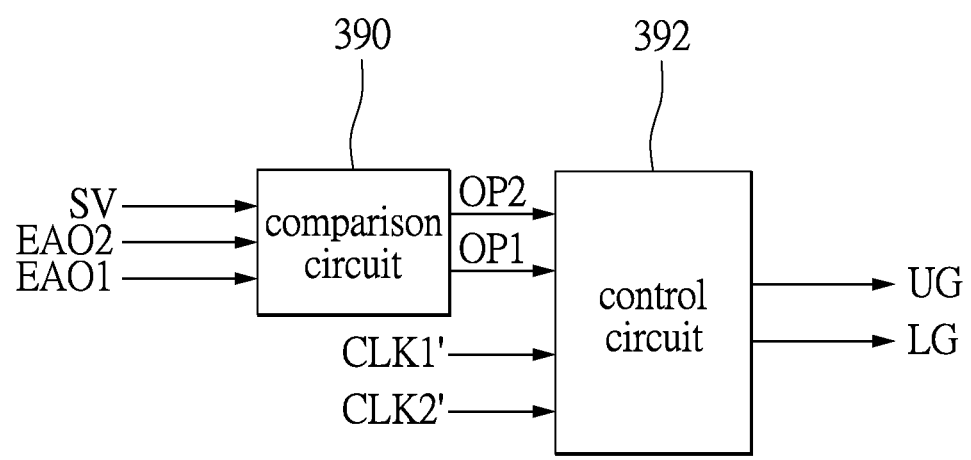
FIG. 7 is a block diagram of a PWM logic control circuit of the SIDO power converter in FIG. 3.

On the other hand, to further describe the PWM logic control circuit 39 of the SIDO power converter 3 in detail, please refer to FIG. 7, which is a block diagram of a PWM logic control circuit of the SIDO power converter in FIG. 3. However, provided herein is only an example of the PWM logic control circuit 39 of the SIDO power converter 3, to which the present invention is not limited. Moreover, the error amplifier circuit 31 may also be operable with the SIDO power converter 3 in FIG. 3. Therefore, please also refer to FIG. 3, FIG. 4 and FIG. 5 for better understanding. Some elements in FIG. 7 are labeled in the same manner as in FIG. 3, and descriptions thereof are not repeated herein.

More particularly, the PWM logic control circuit 39 may include a comparison circuit 390 and a control circuit 392. The comparison circuit 390 is coupled to the error amplifier circuit 31 and the current sensing circuit 33 to generate a first compared signal OP1 and a second compared signal OP2, respectively, according to the first load value EAO1, the second load value EAO2 and the sensed value SV. The control circuit 392 is coupled to the comparison circuit 390, the clock adjustment circuit 37 and the output circuit 30 to generate the first control signal LG and the second control signal UG, respectively, according to the first output clock signal CLK1', the second output clock signal CLK2', the first compared signal OP1 and the second compared signal OP2.

Figure 8:
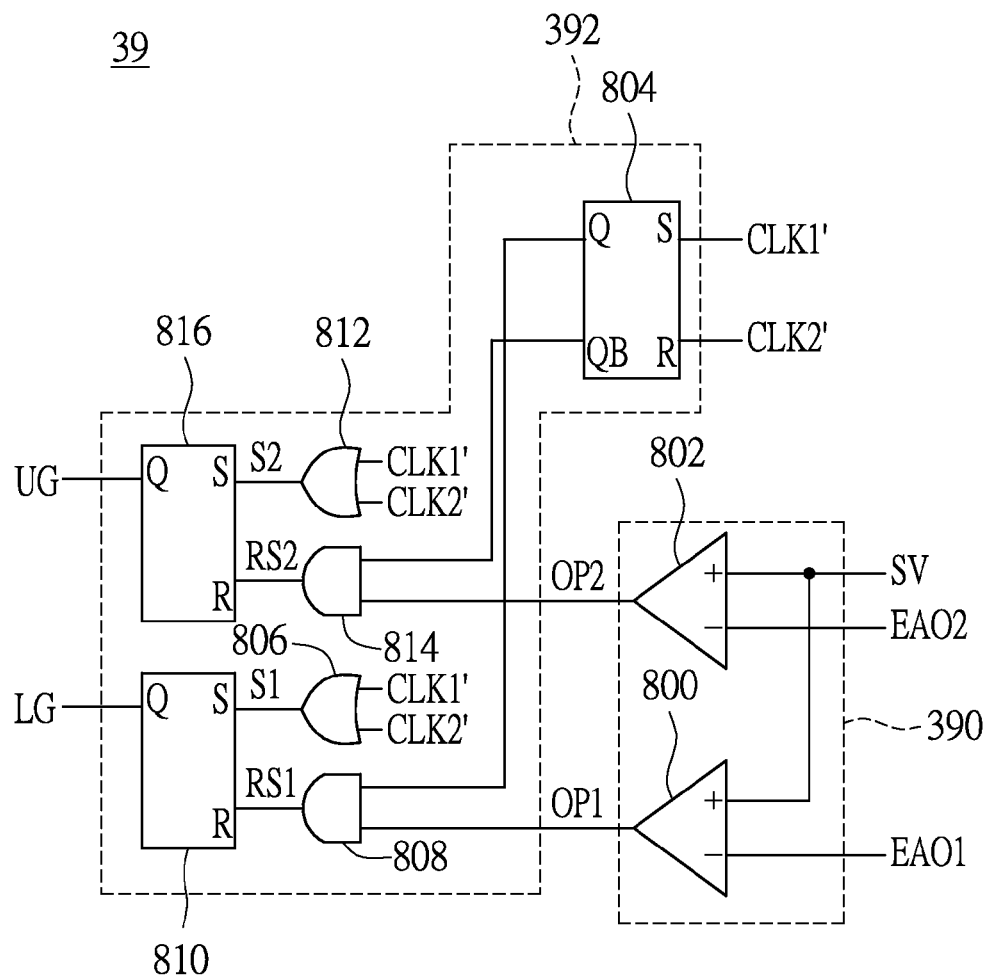
FIG. 8 is a circuit diagram of a PWM logic control circuit of the SIDO power converter in FIG. 3.

Furthermore, referring to FIG. 8, FIG. 8 is a circuit diagram of a PWM logic control circuit of the SIDO power converter in FIG. 3. First, the comparison circuit 390 includes a first comparator 800 and a second comparator 802. The first comparator 800 receives the sensed value SV and the first load value EAO1 at a non-inverting input terminal and an inverting input terminal thereof, respectively, and outputs the first compared signal OP1 being true at an output terminal thereof when the sensed value SV is larger than the first load value EAO1. Moreover, the second comparator 802 receives the sensed value SV and the second load value EAO2 at a non-inverting input terminal and an inverting input terminal thereof, respectively, and outputs the second compared signal OP2 being true at an output terminal thereof when the sensed value SV is larger than the second load value EAO2.

The control circuit 392 includes a first RS flip-flop 804, a first OR gate 806, a first AND gate 808, a second RS flip-flop 810, a second OR gate 812, a second AND gate 814 and a third RS flip-flop 816. The first RS flip-flop 804 receives the first output clock signal CLK1' and the second output clock signal CLK2' at a set terminal and a reset terminal thereof, respectively.

The first OR gate 806 generates a first set signal S1 according to the first output clock signal CLK1' and the second output clock signal CLK2'. The first AND gate 808 generates a first reset signal RS1 according to the first compared signal OP1 and a signal outputted by a non-inverting output terminal of the first RS flip-flop 804. The second RS flip-flop 810 receives the first set signal S1 and the first reset signal RS1 at a set terminal and a reset terminal thereof, respectively, and outputs the first control signal LG at a non-inverting output terminal thereof.

Moreover, the second OR gate 812 generates a second set signal S2 according to the first output clock signal CLK1' and the second output clock signal CLK2'. The second AND gate 814 generates a second reset signal RS2 according to the second compared signal OP2 and a signal outputted by an inverting output terminal of the first RS flip-flop 804. The third RS flip-flop 816 receives the second set signal S2 and the second reset signal RS2 at a set terminal and a reset terminal thereof, respectively, and outputs the second control signal UG at a non-inverting output terminal thereof.

For example, during the operation in a heavy load (for example, the first output terminal OA as shown in FIG. 4), the clock adjustment circuit 37 outputs the first output clock signal CLK1' being true (1) so that the second RS flip-flop 810 and the third RS flip-flop 816 output the first control signal LG and the second control signal UG being true (1) to turn on the first switching transistor LS and the second switching transistor HS, respectively, to store energy.

The first comparator 800 compares the sensed value SV and the first load value EAO1 to generate the first compared signal OP1. Therefore, the first comparator 800 outputs the first compared signal OP1 being true (1) at an output terminal to the first AND gate 808 when the sensed value SV is larger than the first load value EAO1. Moreover, based on the operation of a conventional flip-flop, the first RS flip-flop 804 similarly outputs a signal being true (1) at a non-inverting output terminal. Therefore, the first AND gate 808 outputs the first reset signal RS1 being true (1) to the rest terminal of the second RS flip-flop 810 so that the second RS flip-flop 810 outputs the first control signal LG being not true (0) to turn off the first switching transistor LS to release energy.

Therefore, as previously stated, a person with ordinary skill in the art should understand that, when the first AND gate 808 outputs the first reset signal RS1 being true (1) to the second RS flip-flop 810, the control circuit 392 switches the corresponding first switching transistor LS to be turned off. On the contrary, when the second AND gate 814 outputs the second reset signal RS2 being true (1) to the third RS flip-flop 816, the control circuit 392 switches the corresponding second switching transistor HS to be turned off. Moreover, since the structures of the comparators 800 and 802, the RS flip-flops 804, 810 and 816, the AND gates 808 and 814 and OR gates 806 and 812 are known to a person with ordinary skill in the art, detailed descriptions of the first comparator 800, the second comparator 802, the first RS flip-flop 804, the first OR gate 806, the first AND gate 808, the second RS flip-flop 810, the second OR gate 812, the second AND gate 814 and the third RS flip-flop 816 are not to be repeated herein. In short, the examples of the implementations of these elements are only exemplary and are not to limit the present invention.

It should be noted that, as previously stated, the first switching transistor LS may be an N-channel metal-oxide-semiconductor field-effect transistor (N-channel MOSFET, NMOS), and the second switching transistor HS may be a P-channel metal-oxide-semiconductor field-effect transistor (P-channel MOSFET, PMOS). Therefore, a person with ordinary skill in the art should understand that, practically, the second control signal UG outputted by the third RS flip-flop 816 is to be fed into an inverter (not shown) to output an inverted second control signal UG to the second switching transistor HS implemented by a PMOS, to which the present invention is not limited. A person of ordinary skill in the art may make any modifications according to practical demands.

Figure 9:
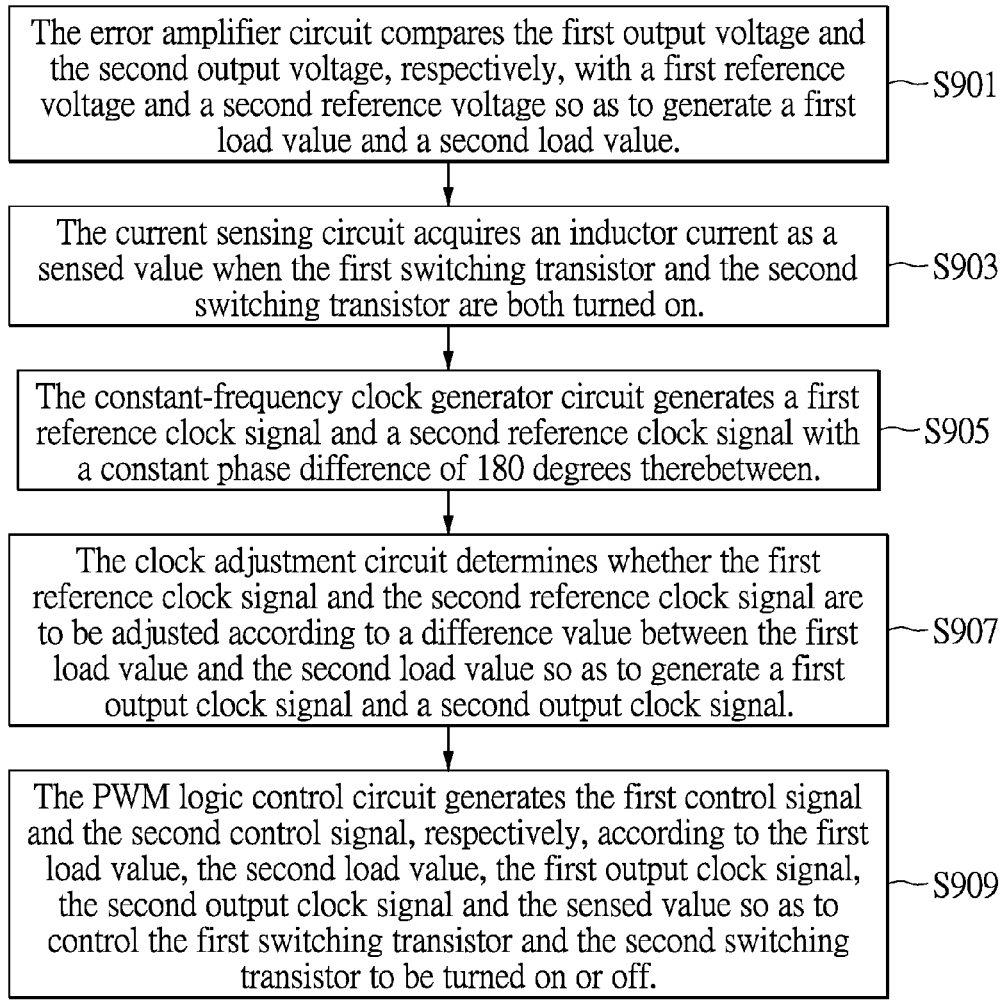
FIG. 9 is a flowchart of a method for controlling a SIDO power converter operable in a discontinuous conduction mode according to one embodiment of the present invention.

On the other hand, to further describe the operation of the SIDO power converter 3 in detail, the present invention further provides a method for controlling the SIDO power converter 3. Referring to FIG. 9, FIG. 9 is a flowchart of a method for controlling a SIDO power converter operable in a discontinuous conduction mode according to one embodiment of the present invention. The method of the present embodiment can be performed with the SIDO power converter 3 in FIG. 3. Therefore, please also refer to FIG. 3 and FIG. 9 for better understanding. Moreover, detailed descriptions of the elements in the steps have been presented previously and thus are not repeated herein.

First, in Step S901, the error amplifier circuit compares the first output voltage and the second output voltage, respectively, with a first reference voltage and a second reference voltage so as to generate a first load value and a second load value. In Step S903, the current sensing circuit acquires an inductor current as a sensed value when the first switching transistor and the second switching transistor are both turned on. In Step S905, the constant-frequency clock generator circuit generates a first reference clock signal and a second reference clock signal with a constant phase difference of 180 degrees therebetween. In Step S907, the clock adjustment circuit determines whether the first reference clock signal and the second reference clock signal are to be adjusted according to a difference value between the first load value and the second load value so as to generate a first output clock signal and a second output clock signal. In Step S909, the PWM logic control circuit generates the first control signal and the second control signal, respectively, according to the first load value, the second load value, the first output clock signal, the second output clock signal and the sensed value so as to control the first switching transistor and the second switching transistor to be turned on or off.

Substantially, when the difference value between the first load value and the second load value is zero, the switching between the loads remains at a constant frequency. Therefore, the clock adjustment circuit does not adjust the phase difference between the first reference clock signal and the second reference clock signal and outputs the first reference clock signal and the second reference clock signal as the first output clock signal and the second output clock signal, respectively. Moreover, when the difference value between the first load value and the second load value is larger than zero, the clock adjustment circuit adjusts the phase difference between the first reference clock signal and the second reference clock signal to generate the first output clock signal and the second output clock signal with a phase difference larger than 180 degrees. In other words, once an output terminal being a light load finishes releasing energy, the other output terminal being a heavy load may start to store energy after an idle period shorter than the previous period. On the contrary, when the difference value between the first load value and the second load value is smaller than zero, the clock adjustment circuit adjusts the phase difference between the first reference clock signal and the second reference clock signal to generate the first output clock signal and the second output clock signal with a phase difference smaller than 180 degrees. In short, the present invention is not limited to the previous examples of the clock adjustment circuit. A person of ordinary skill in the art may make any modifications according to practical demands.

To sum up, the present invention provides a SIDO power converter operable in a discontinuous conduction mode and a control method thereof, capable of dynamically adjusting output timings of clock signals with respect to the loads according to a load difference therebetween to lower the power consumption with a light load when the inductor current is zero to achieve optimal power distribution. In addition, the SIDO power converter operable in a peak-current control mode and the control method thereof use an internal current sensing circuit to acquire an inductor current as a sensed value when the first switching transistor and the second switching transistor are both turned on, so that the PWM logic control circuit determines whether the inductor current increases to a threshold according to the sensed value to switch the corresponding first switching transistor or the second switching transistor to be turned off.

Figure 10:
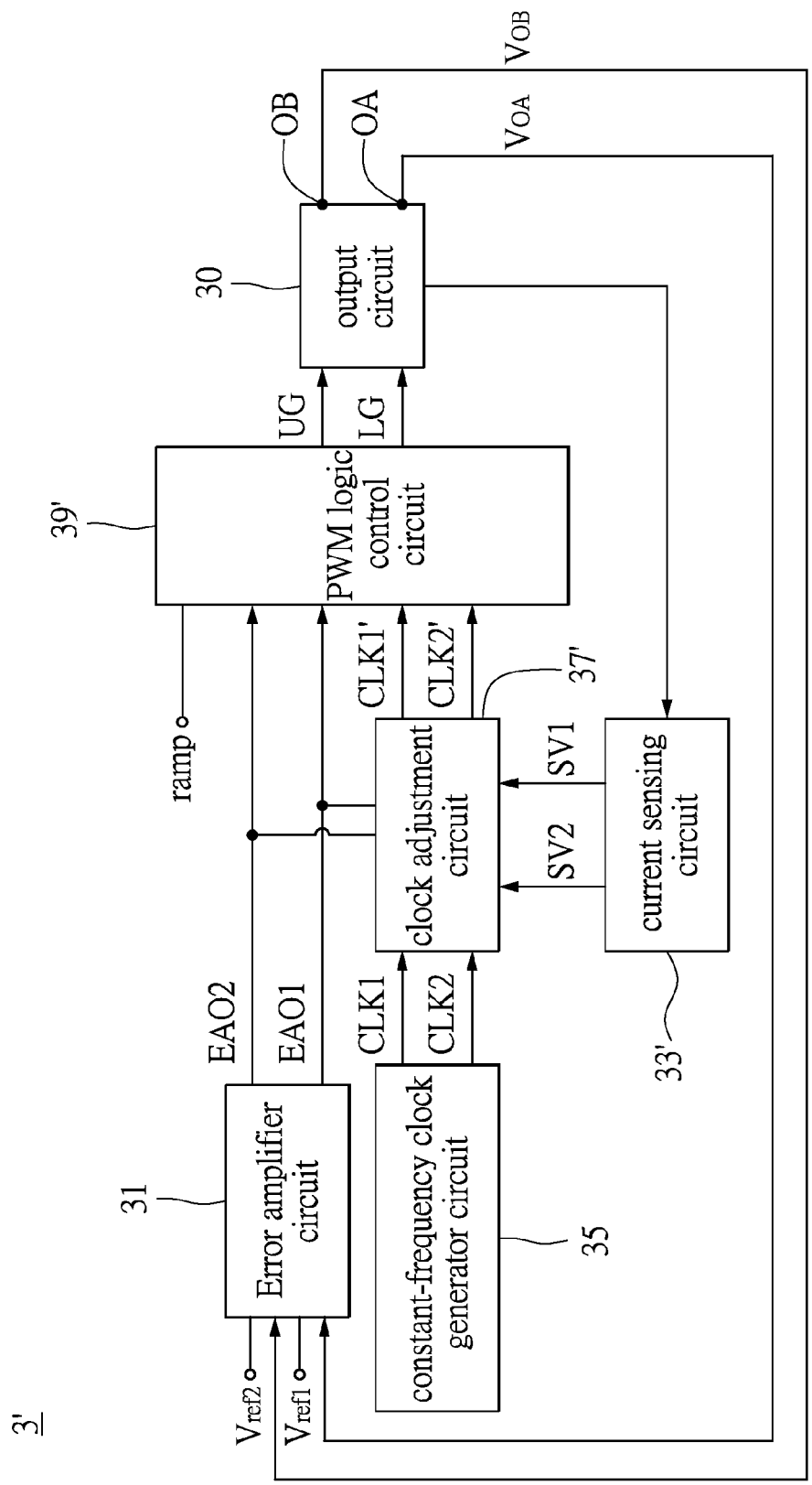
FIG. 10 is a block diagram of a SIDO power converter operable in a discontinuous conduction mode according to another embodiment of the present invention.

Therefore, referring to FIG. 10, FIG. 10 is a block diagram of a SIDO power converter operable in a discontinuous conduction mode according to another embodiment of the present invention. Some elements in FIG. 10 are labeled in the same manner as in FIG. 3, and descriptions thereof are not repeated herein. In short, compared to the SIDO power converter 3 in FIG. 3, the SIDO power converter 3' in FIG. 10 is different in that the SIDO power converter 3' is operable in a voltage control mode. The voltage control mode is characterized in that the switching transistor is determined to be turned on or off according to the output from the error amplifier circuit 31 and a ramp waveform based on an internal clock.

More particularly, the SIDO power converter 3' includes an output circuit 30, an error amplifier circuit 31, a current sensing circuit 33', a constant-frequency clock generator circuit 35, a clock adjustment circuit 37' and a PWM logic control circuit 39'. These elements in the SIDO power converter 3' can be implemented by hardware circuitry, or by hardware circuitry with firmware or with software. In short, the present invention is not limited to the previous example of the SIDO power converter 3'. Moreover, the output circuit 30, the error amplifier circuit 31, the current sensing circuit 33', the constant-frequency clock generator circuit 35, the clock adjustment circuit 37' and the PWM logic control circuit 39' can be integrated or discretely installed, to which the present invention is not limited.

Figure 11:
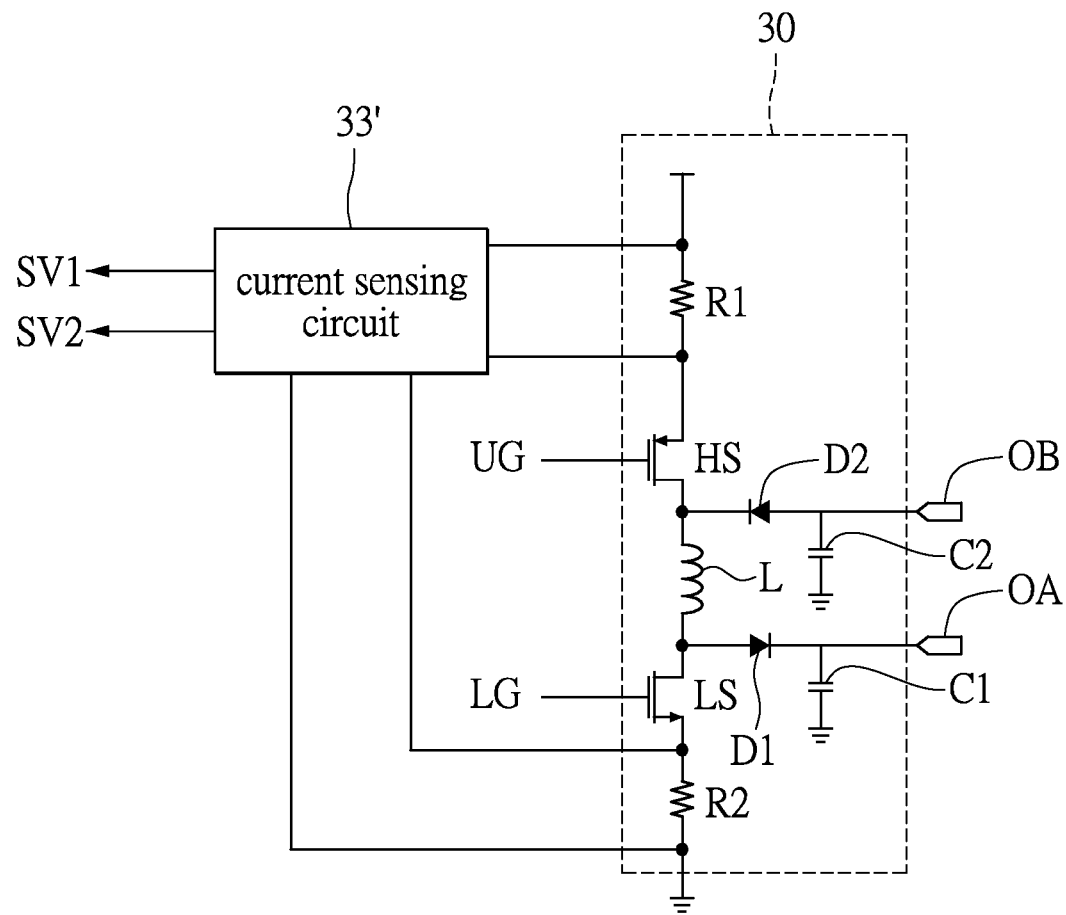
FIG. 11 is a circuit diagram of a current sensing circuit of the SIDO power converter in FIG. 10.

Furthermore, referring to FIG. 11, FIG. 11 is a circuit diagram of a current sensing circuit of the SIDO power converter in FIG. 10. The current sensing circuit 33' in the present embodiment is operable in the SIDO power converter 3' in FIG. 10. Therefore, please further refer to FIG. 10 for better understanding. Moreover, some elements in FIG. 11 are labeled in the same manner as in FIG. 10 and FIG. 4, and descriptions thereof are not repeated herein.

Furthermore, the current sensing circuit 33' acquires an inductor current IL as a first sensed value SV1 when the first switching transistor LS is turned off and the second switching transistor HS is turned on and an inductor current IL as a second sensed value SV2 when the first switching transistor LS is turned on and the second switching transistor HS is turned off. Therefore, for the sake of convenience, the current sensing circuit 33' may be coupled to two terminals of each of two resistors R1 and R2 connected in series with the first switching transistor LS and the second switching transistor HS, respectively, as shown in FIG. 11 to sense a value of a voltage across one of the two resistors R1 connected in series with the second switching transistor HS to acquire the first sensed value SV1 when the first switching transistor LS is turned off and the second switching transistor HS is turned on. Moreover, the current sensing circuit 33' senses a value of a voltage across the other of the two resistors R2 connected in series with the first switching transistor LS to acquire the second sensed value SV2 when the first switching transistor LS is turned on and the second switching transistor HS is turned off. It should be noted that the current sensing circuit 33' in FIG. 11 is only an example thereof, to which the present invention is not limited. A person of ordinary skill in the art may make any modifications according to practical demands.

Referring back to FIG. 10, the clock adjustment circuit 37' is coupled to the current sensing circuit 33' and the constant-frequency clock generator circuit 35 and determines whether the first reference clock signal CLK1 and the second reference clock signal CLK2 are to be adjusted according to a difference value (for example, SV1−SV2) between the first sensed value SV1 and the second sensed value SV2 so as to generate a first output clock signal CLK1' and a second output clock signal CLK2'. Therefore, in view of the above, a person with ordinary skill in the art should understand that the output from the current sensing circuit 33' in the SIDO power converter 3' in the present embodiment can be used to determine the difference between the two loads.

Substantially, under ideal circumstances, if the first output terminal OA and the second output terminal OB are both in the boost mode (or the buck-boost mode) and supply identical voltages, the first sensed value SV1 and the second sensed value SV2 outputted by the current sensing circuit 33' are also identical. Therefore, the difference value between the first sensed value SV1 and the second sensed value SV2 equals zero. In other words, the switching between the boost mode and the buck-boost mode remains at a constant frequency. Therefore, the clock adjustment circuit 37' does not have to adjust the phase difference between the first reference clock signal CLK1 and the second reference clock signal CLK2, and outputs the first reference clock signal CLK1 and the second reference clock signal CLK2 as a first output clock signal CLK1' and a second output clock signal CLK2', respectively.

On the other hand, in FIG. 11 for example, when the first output terminal OA is in the boost mode and the second output terminal OB is in the buck-boost mode, the first sensed value SV1 outputted by the current sensing circuit 33' exceeds the second sensed value SV2 so that the difference value between the first sensed value SV1 and the second sensed value SV2 is larger than zero. Therefore, the clock adjustment circuit 37' adjusts the phase difference between the first reference clock signal CLK1 and the second reference clock signal CLK2 to generate the first output clock signal CLK1' and the second output clock signal CLK2' with a phase difference larger than 180 degrees. On the contrary, when first output terminal OA is in the buck-boost mode and the second output terminal OB is in the boost mode, the first sensed value SV1 outputted by the current sensing circuit 33' is smaller than the second sensed value SV2 so that the difference value between the first sensed value SV1 and the second sensed value SV2 is smaller than zero. Therefore, the clock adjustment circuit 37' adjusts the phase difference between the first reference clock signal CLK1 and the second reference clock signal CLK2 to generate the first output clock signal CLK1' and the second output clock signal CLK2' with a phase difference smaller than 180 degrees. In other words, when the SIDO power converter 3' of the present invention determines a difference between the two loads and dynamically adjusts output timings of clock signals with respect to the load difference so that once the second output terminal OB being a light load finishes releasing energy, the first output terminal OA may start to store energy after an idle period shorter than the previous period.

Furthermore, the PWM logic control circuit 39' is coupled to the output circuit 30, the error amplifier circuit 31 and the clock adjustment circuit 37', and generates the first control signal LG and the second control signal UG, respectively, according to the first load value EAO1, the second load value EAO2, the first output clock signal CLK1', the second output clock signal CLK2' and a ramp waveform based on an internal clock so as to control the first switching transistor LS and the second switching transistor HS to be turned on or off.

Figure 12:
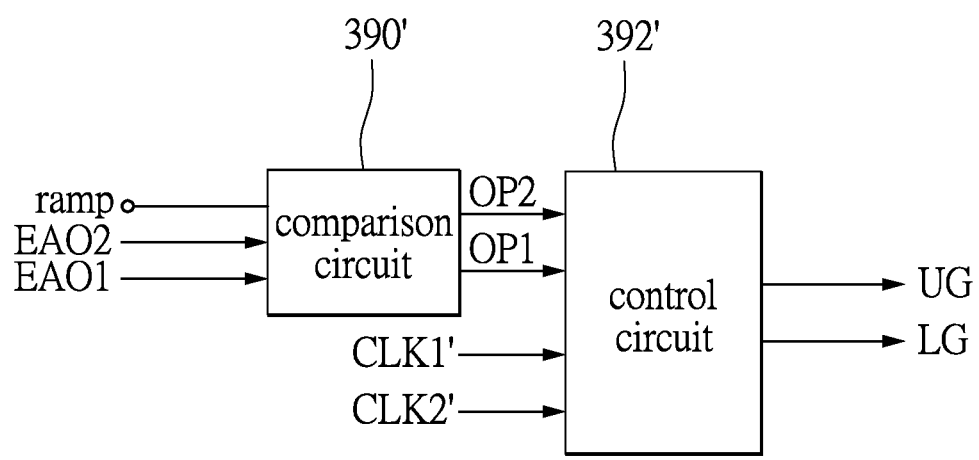
FIG. 12 is a block diagram of a PWM logic control circuit of the SIDO power converter in FIG. 10.

To further describe the PWM logic control circuit 39' of the SIDO power converter 3' in detail, please refer to FIG. 12, which is a block diagram of a PWM logic control circuit of the SIDO power converter in FIG. 10. However, provided herein is only an example of the PWM logic control circuit 39' of the SIDO power converter 3', to which the present invention is not limited. Therefore, please also refer to FIG. 10 and FIG. 11 for better understanding. Some elements in FIG. 12 are labeled in the same manner as in FIG. 10, and descriptions thereof are not repeated herein.

More particularly, the PWM logic control circuit 39' may include a comparison circuit 390' and a control circuit 392'. The comparison circuit 390' is coupled to the error amplifier circuit 31 to generate a first compared signal OP1 and a second compared signal OP2, respectively, according to the first load value EAO1, the second load value EAO2 and the ramp waveform. The control circuit 392' is coupled to the comparison circuit 390', the clock adjustment circuit 37' and the output circuit 30 to generate the first control signal LG and the second control signal UG, respectively, according to the first output clock signal CLK1', the second output clock signal CLK2', the first compared signal OP1 and the second compared signal OP2.

Figure 13:
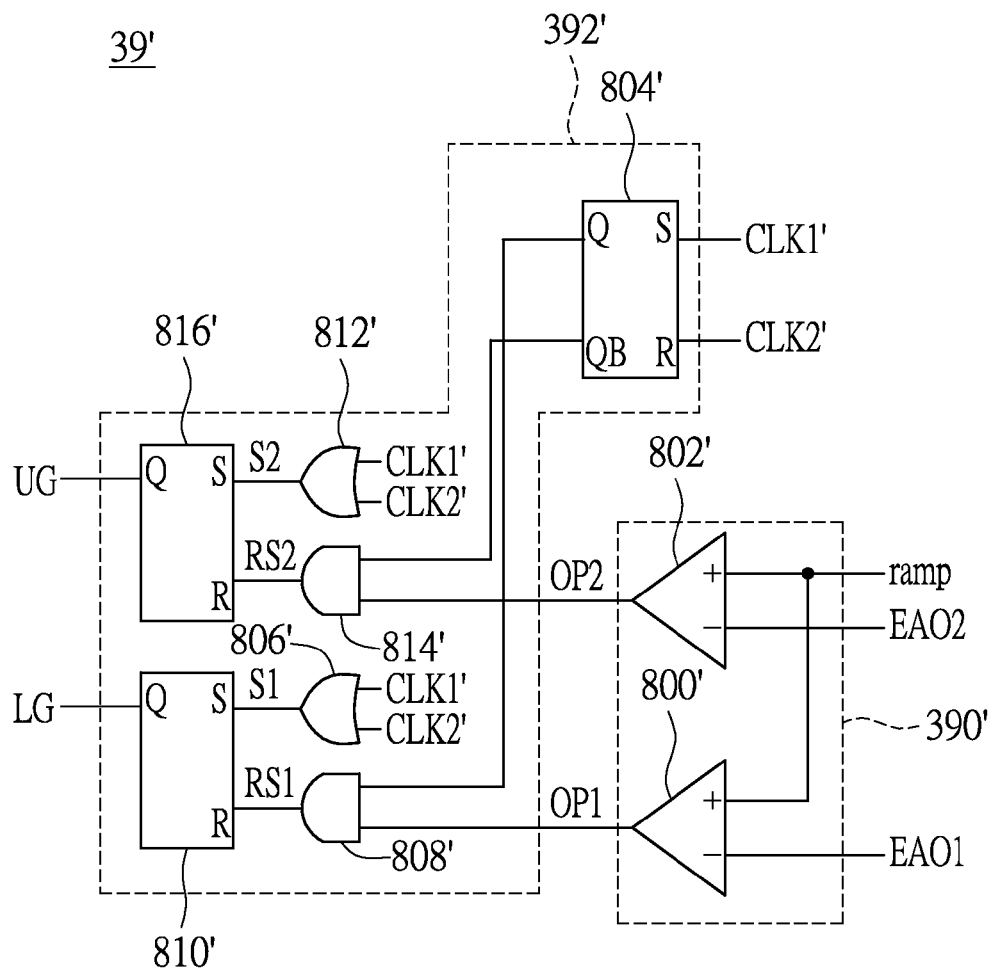
FIG. 13 is a circuit diagram of a PWM logic control circuit of the SIDO power converter in FIG. 10.

Furthermore, referring to FIG. 13, FIG. 13 is a circuit diagram of a PWM logic control circuit of the SIDO power converter in FIG. 10. First, the comparison circuit 390' includes a first comparator 800' and a second comparator 802'. The first comparator 800' receives the ramp waveform and the first load value EAO1 at a non-inverting input terminal and an inverting input terminal thereof, respectively, and outputs the first compared signal OP1 being true at an output terminal thereof when the ramp waveform is larger than the first load value EAO1. Moreover, the second comparator 802' receives the ramp waveform and the second load value EAO2 at a non-inverting input terminal and an inverting input terminal thereof, respectively, and outputs the second compared signal OP2 being true at an output terminal thereof when the ramp waveform is larger than the second load value EAO2.

The control circuit 392' includes a first RS flip-flop 804', a first OR gate 806', a first AND gate 808', a second RS flip-flop 810', a second OR gate 812', a second AND gate 814' and a third RS flip-flop 816'. The first RS flip-flop 804' receives the first output clock signal CLK1' and the second output clock signal CLK2' at a set terminal and a reset terminal thereof, respectively.

The first OR gate 806' generates a first set signal S1 according to the first output clock signal CLK1' and the second output clock signal CLK2'. The first AND gate 808' generates a first reset signal RS1 according to the first compared signal OP1 and a signal outputted by a non-inverting output terminal of the first RS flip-flop 804'. The second RS flip-flop 810' receives the first set signal S1 and the first reset signal RS1 at a set terminal and a reset terminal thereof, respectively, and outputs the first control signal LG at a non-inverting output terminal thereof.

Moreover, the second OR gate 812' generates a second set signal S2 according to the first output clock signal CLK1' and the second output clock signal CLK2'. The second AND gate 814' generates a second reset signal RS2 according to the second compared signal OP2 and a signal outputted by an inverting output terminal of the first RS flip-flop 804'. The third RS flip-flop 816' receives the second set signal S2 and the second reset signal RS2 at a set terminal and a reset terminal thereof, respectively, and outputs the second control signal UG at a non-inverting output terminal thereof.

Therefore, as previously stated, a person with ordinary skill in the art should understand that, when the first AND gate 808' outputs the first reset signal RS1 being true (1) to the second RS flip-flop 810', the control circuit 392' switches the corresponding first switching transistor LS to be turned off. On the contrary, when the second AND gate 814' outputs the second reset signal RS2 being true (1) to the third RS flip-flop 816', the control circuit 392' switches the corresponding second switching transistor HS to be turned off. Moreover, since the structures of the comparators 800' and 802', the RS flip-flops 804', 810' and 816', the AND gates 808' and 814' and OR gates 806' and 812' are known to a person with ordinary skill in the art, detailed descriptions of the first comparator 800', the second comparator 802', the first RS flip-flop 804', the first OR gate 806', the first AND gate 808', the second RS flip-flop 810', the second OR gate 812', the second AND gate 814' and the third RS flip-flop 816' are not to be repeated herein. In short, the examples of the implementations of these elements are only exemplary and are not to limit the present invention.

It should be noted that, as previously stated, the first switching transistor LS may be an N-channel metal-oxide-semiconductor field-effect transistor (N-channel MOSFET, NMOS), and the second switching transistor HS may be a P-channel metal-oxide-semiconductor field-effect transistor (P-channel MOSFET, PMOS). Therefore, a person with ordinary skill in the art should understand that, practically, the second control signal UG outputted by the third RS flip-flop 816' is to be fed into an inverter (not shown) to output an inverted second control signal UG to the second switching transistor HS implemented by a PMOS, to which the present invention is not limited. A person of ordinary skill in the art may make any modifications according to practical demands.

Figure 14:
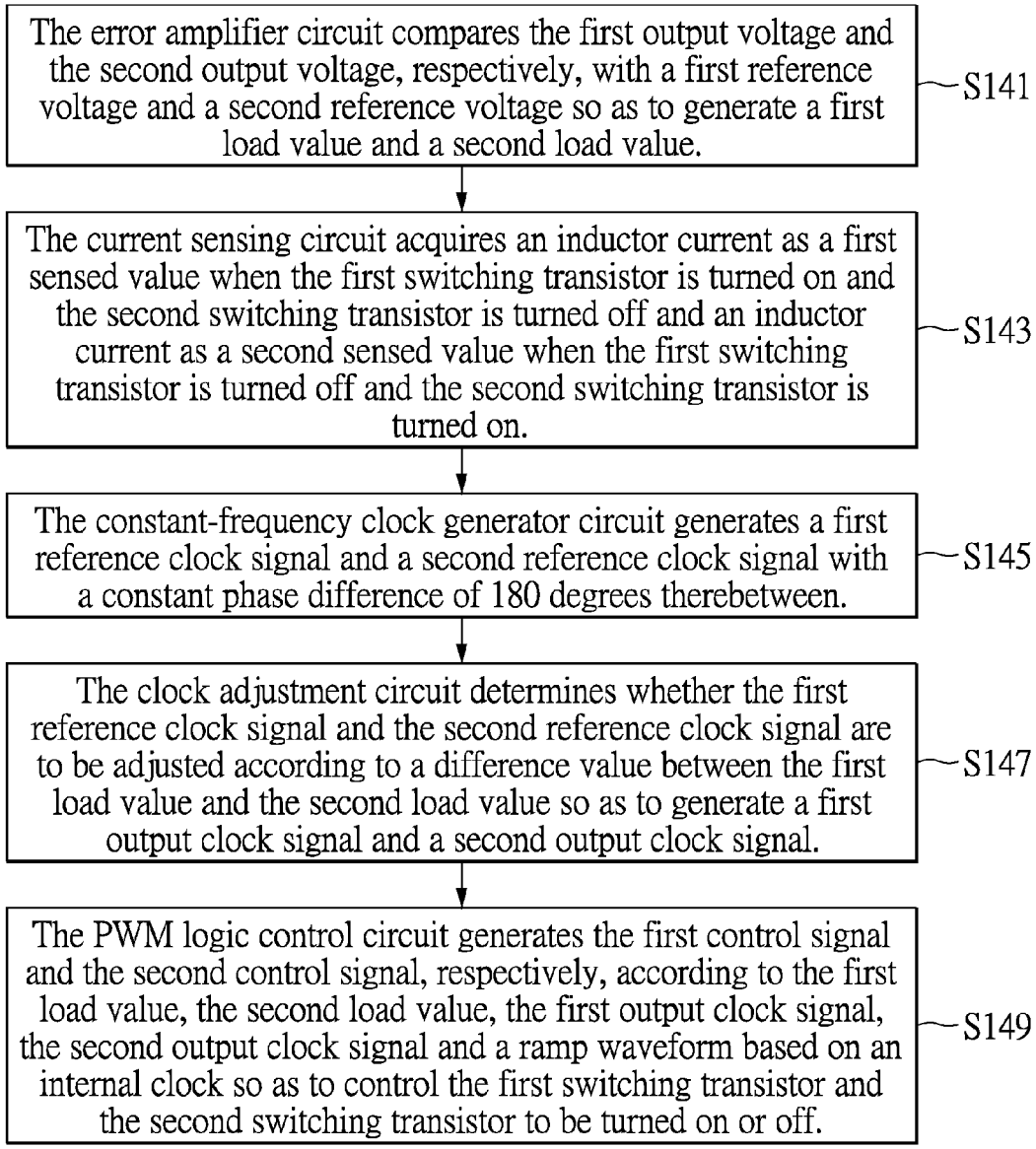
FIG. 14 is a flowchart of a method for controlling a SIDO power converter operable in a discontinuous conduction mode according to another embodiment of the present invention.

On the other hand, to further describe the operation of the SIDO power converter 3' in detail, the present invention further provides a method for controlling the SIDO power converter 3'. Referring to FIG. 14, FIG. 14 is a flowchart of a method for controlling a SIDO power converter operable in a discontinuous conduction mode according to another embodiment of the present invention. The method of the present embodiment can be performed with the SIDO power converter 3' in FIG. 10. Therefore, please also refer to FIG. 10~FIG. 13 for better understanding. Moreover, detailed descriptions of the elements in the steps have been presented previously and thus are not repeated herein.

First, in Step S141, the error amplifier circuit compares the first output voltage and the second output voltage, respectively, with a first reference voltage and a second reference voltage so as to generate a first load value and a second load value. In Step S143, the current sensing circuit acquires an inductor current as a first sensed value when the first switching transistor is turned on and the second switching transistor is turned off and an inductor current as a second sensed value when the first switching transistor is turned off and the second switching transistor is turned on. In Step S145, the constant-frequency clock generator circuit generates a first reference clock signal and a second reference clock signal with a constant phase difference of 180 degrees therebetween. In Step S147, the clock adjustment circuit determines whether the first reference clock signal and the second reference clock signal are to be adjusted according to a difference value between the first sensed value and the second sensed value so as to generate a first output clock signal and a second output clock signal. In Step S149, the PWM logic control circuit generates the first control signal and the second control signal, respectively, according to the first load value, the second load value, the first output clock signal, the second output clock signal and a ramp waveform based on an internal clock so as to control the first switching transistor and the second switching transistor to be turned on or off.

Substantially, when the difference value between the first sensed value and the second sensed value is zero, the switching between the loads remains at a constant frequency. Therefore, the clock adjustment circuit does not adjust the phase difference between the first reference clock signal and the second reference clock signal and outputs the first reference clock signal and the second reference clock signal as the first output clock signal and the second output clock signal, respectively. Moreover, when the difference value between the first sensed value and the second sensed value is larger than zero, the clock adjustment circuit adjusts the phase difference between the first reference clock signal and the second reference clock signal to generate the first output clock signal and the second output clock signal with a phase difference larger than 180 degrees. In other words, once an output terminal being a light load finishes releasing energy, the other output terminal being a heavy load may start to store energy after an idle period shorter than the previous period. On the contrary, when the difference value between the first sensed value and the second sensed value is smaller than zero, the clock adjustment circuit adjusts the phase difference between the first reference clock signal and the second reference clock signal to generate the first output clock signal and the second output clock signal with a phase difference smaller than 180 degrees. In short, the present invention is not limited to the previous examples of the clock adjustment circuit. A person of ordinary skill in the art may make any modifications according to practical demands.

To sum up, the present invention provides a SIDO power converter operable in a discontinuous conduction mode and a control method thereof, capable of dynamically adjusting output timings of clock signals with respect to the loads according to a load difference therebetween to lower the power consumption with a light load when the inductor current is zero to achieve optimal power distribution. In addition, the SIDO power converter operable in a voltage control mode and the control method thereof use an internal current sensing circuit to acquire an inductor current as a sensed value on the two loads, respectively, to determine the difference between the loads. Moreover, the PWM logic control circuit determines the first switching transistor or the second switching transistor to be turned off according to the output from the error amplifier circuit and a ramp waveform based on an internal clock.

The above-mentioned descriptions represent merely the exemplary embodiments of the present disclosure, without any intention to limit the scope of the present disclosure thereto. Various equivalent changes, alterations or modifications based on the claims of present disclosure are all consequently viewed as being embraced by the scope of the present disclosure.

What is claimed is:

1. A single-inductor dual-output (SIDO) power converter operable in a discontinuous conduction mode (DCM), comprising:
    an output circuit comprising a first output terminal and a second output terminal for outputting a first output voltage and a second output voltage, respectively, an inductor, a first switching transistor and a second switching transistor, wherein said first switching transistor and said second switching transistor are controlled by a first control signal and a second control signal, respectively, to determine whether said first switching transistor and said second switching transistor are turned on or off so as to generate said first output voltage and said second output voltage;
    an error amplifier circuit, being coupled to said first output terminal and said second output terminal for comparing said first output voltage and said second output voltage, respectively, with a first reference voltage and a second reference voltage so as to generate a first load value and a second load value;
    a current sensing circuit, being coupled to said output circuit for acquiring an inductor current as a sensed value when said first switching transistor and said second switching transistor are both turned on;
    a constant-frequency clock generator circuit for generating a first reference clock signal and a second reference clock signal with a constant phase difference of 180 degrees therebetween;
    a clock adjustment circuit, being coupled to said error amplifier circuit and said constant-frequency clock generator circuit, for determining whether said first reference clock signal and said second reference clock signal are to be adjusted according to a difference value between said first load value and said second load value so as to generate a first output clock signal and a second output clock signal; and
    a PWM logic control circuit, being coupled to said output circuit, said error amplifier circuit, said clock adjustment circuit and said current sensing circuit, for generating said first control signal and said second control signal, respectively, according to said first load value, said second load value, said first output clock signal, said second output clock signal and said sensed value so as to control said first switching transistor and said second switching transistor to be turned on or off;
    wherein said PWM logic control circuit comprises:
    a comparison circuit, being coupled to said error amplifier circuit and said current sensing circuit, for generating a first compared signal and a second compared signal, respectively, according to said first load value, said second load value and said sensed value; and
    a control circuit, being coupled to said comparison circuit, said clock adjustment circuit and said output circuit, for generating said first control signal and said second control signal, respectively, according to said first output clock signal, said second output clock signal, said first compared signal and said second compared signal;
    wherein said control circuit comprises:
    a first RS flip-flop, for receiving said first output clock signal and said second output clock signal at a set terminal and a reset terminal thereof, respectively;
    a first OR gate, for generating a first set signal according to said first output clock signal and said second output clock signal;
    a first AND gate, for generating a first reset signal according to said first compared signal and a signal outputted by a non-inverting output terminal of said first RS flip-flop;
    a second RS flip-flop, for receiving said first set signal and said first reset signal at a set terminal and a reset terminal thereof, respectively, and outputting said first control signal at a non-inverting output terminal thereof;
    a second OR gate, for generating a second set signal according to said first output clock signal and said second output clock signal;
    a second AND gate, for generating a second reset signal according to said second compared signal and a signal outputted by an inverting output terminal of said first RS flip-flop; and
    a third RS flip-flop, for receiving said second set signal and said second reset signal at a set terminal and a reset terminal thereof, respectively, and outputting said second control signal at a non-inverting output terminal thereof.

2. The SIDO power converter of claim 1, wherein said SIDO power converter is operable in a peak-current control mode.

3. The SIDO power converter of claim 1, wherein said clock adjustment circuit adjusts said phase difference between said first reference clock signal and said second reference clock signal so as to generate said first output clock signal and said second output clock signal with a phase difference larger than 180 degrees when said difference value is larger than zero, and said clock adjustment circuit adjusts said phase difference between said first reference clock signal and said second reference clock signal so as to generate said first output clock signal and said second output clock signal with a phase difference smaller than 180 degrees when said difference value is smaller than zero.

4. The SIDO power converter of claim 1, wherein said comparison circuit comprises:
    a first comparator, for receiving said sensed value and said first load value at a non-inverting input terminal and an inverting input terminal thereof, respectively, and outputting said first compared signal being true at an output terminal thereof when said sensed value is larger than said first load value; and
    a second comparator, for receiving said sensed value and said second load value at a non-inverting input terminal and an inverting input terminal thereof, respectively, and outputting said second compared signal being true at an output terminal thereof when said sensed value is larger than said second load value.

5. The SIDO power converter of claim 1, wherein said current sensing circuit is coupled to two terminals of a resistor connected in series with said first switching transistor or said second switching transistor to sense a value of a voltage across said resistor to acquire said sensed value when said first switching transistor and said second switching transistor are both turned on.

6. A method for controlling a SIDO power converter operable in a discontinuous conduction mode, said SIDO power converter comprising an output circuit, an error amplifier circuit, a current sensing circuit, a constant-frequency clock generator circuit, a clock adjustment circuit and a PWM logic control circuit, said output circuit comprising a first output terminal and a second output terminal for outputting a first output voltage and a second output voltage, respectively, an inductor, a first switching transistor and a second switching transistor, said first switching transistor and said second switching transistor being controlled by a first control signal and a second control signal, respectively, to determine whether said first switching transistor and said second switching transistor are turned on or off so as to generate said first output voltage and said second output voltage, said method comprising:

comparing, by said error amplifier circuit, said first output voltage and said second output voltage, respectively, with a first reference voltage and a second reference voltage so as to generate a first load value and a second load value;

acquiring, by said current sensing circuit, an inductor current as a sensed value when said first switching transistor and said second switching transistor are both turned on;

generating, by said constant-frequency clock generator circuit, a first reference clock signal and a second reference clock signal with a constant phase difference of 180 degrees therebetween;

determining, by said clock adjustment circuit, whether said first reference clock signal and said second reference clock signal are to be adjusted according to a difference value between said first load value and said second load value so as to generate a first output clock signal and a second output clock signal; and generating, by said PWM logic control circuit, said first control signal and said second control signal, respectively, according to said first load value, said second load value, said first output clock signal, said second output clock signal and said sensed value so as to control said first switching transistor and said second switching transistor to be turned on or off;

wherein said PWM logic control circuit comprises:

a comparison circuit, being coupled to said error amplifier circuit and said current sensing circuit, for generating a first compared signal and a second compared signal, respectively, according to said first load value, said second load value and said sensed value; and a control circuit, being coupled to said comparison circuit, said clock adjustment circuit and said output circuit, for generating said first control signal and said second control signal, respectively, according to said first output clock signal, said second output clock signal, said first compared signal and said second compared signal;

wherein said control circuit comprises:

a first RS flip-flop, for receiving said first output clock signal and said second output clock signal at a set terminal and a reset terminal thereof, respectively;

a first OR gate, for generating a first set signal according to said first output clock signal and said second output clock signal;

a first AND gate, for generating a first reset signal according to said first compared signal and a signal outputted by a non-inverting output terminal of said first RS flip-flop;

a second RS flip-flop, for receiving said first set signal and said first reset signal at a set terminal and a reset terminal thereof, respectively, and outputting said first control signal at a non-inverting output terminal thereof;

a second OR gate, for generating a second set signal according to said first output clock signal and said second output clock signal;

a second AND gate, for generating a second reset signal according to said second compared signal and a signal outputted by an inverting output terminal of said first RS flip-flop; and a third RS flip-flop, for receiving said second set signal and said second reset signal at a set terminal and a reset terminal thereof, respectively, and outputting said second control signal at a non-inverting output terminal thereof.

7. The method of claim 6, wherein said SIDO power converter is operable in a peak-current control mode.

8. The method of claim 6, wherein said clock adjustment circuit adjusts said phase difference between said first reference clock signal and said second reference clock signal so as to generate said first output clock signal and said second output clock signal with a phase difference larger than 180 degrees when said difference value is larger than zero, and said clock adjustment circuit adjusts said phase difference between said first reference clock signal and said second reference clock signal so as to generate said first output clock signal and said second output clock signal with a phase difference smaller than 180 degrees when said difference value is smaller than zero.

9. A SIDO power converter operable in a discontinuous conduction mode, comprising:

an output circuit comprising a first output terminal and a second output terminal for outputting a first output voltage and a second output voltage, respectively, an inductor, a first switching transistor and a second switching transistor, wherein said first switching transistor and said second switching transistor are controlled by a first control signal and a second control signal, respectively, to determine whether said first switching transistor and said second switching transistor are turned on or off so as to generate said first output voltage and said second output voltage;

an error amplifier circuit, being coupled to said first output terminal and said second output terminal for comparing said first output voltage and said second output voltage, respectively, with a first reference voltage and a second reference voltage so as to generate a first load value and a second load value;

a current sensing circuit, being coupled to said output circuit for acquiring an inductor current as a first sensed value when said first switching transistor is turned on and said second switching transistor is turned off and for acquiring an inductor current as a second sensed value when said first switching transistor is turned off and said second switching transistor is turned on;

a constant-frequency clock generator circuit for generating a first reference clock signal and a second reference clock signal with a constant phase difference of 180 degrees therebetween;

a clock adjustment circuit, being coupled to said current sensing circuit and said constant-frequency clock generator circuit, for determining whether said first reference clock signal and said second reference clock signal are to be adjusted according to a difference value between said first load value and said second load value so as to generate a first output clock signal and a second output clock signal; and a PWM logic control circuit, being coupled to said output circuit, said error amplifier circuit and said clock adjustment circuit, for generating said first control signal and said second control signal, respectively, according to said first load value, said second load value, said first output clock signal, said second output clock signal and a ramp waveform based on an internal clock so as to control said first switching transistor and said second switching transistor to be turned on or off;

wherein said PWM logic control circuit comprises:

a comparison circuit, being coupled to said error amplifier circuit, for generating a first compared signal and a second compared signal, respectively, according to said first load value, said second load value and said ramp waveform; and a control circuit, being coupled to said comparison circuit, said clock adjustment circuit and said output circuit, for generating said first control signal and said second control signal, respectively, according to said first output clock signal, said second output clock signal, said first compared signal and said second compared signal;

wherein said control circuit comprises:

a first RS flip-flop, for receiving said first output clock signal and said second output clock signal at a set terminal and a reset terminal thereof, respectively;

a first OR gate, for generating a first set signal according to said first output clock signal and said second output clock signal;

a first AND gate, for generating a first reset signal according to said first compared signal and a signal outputted by a non-inverting output terminal of said first RS flip-flop;

a second RS flip-flop, for receiving said first set signal and said first reset signal at a set terminal and a reset terminal thereof, respectively, and outputting said first control signal at a non-inverting output terminal thereof;

a second OR gate, for generating a second set signal according to said first output clock signal and said second output clock signal;

a second AND gate, for generating a second reset signal according to said second compared signal and a signal outputted by an inverting output terminal of said first RS flip-flop; and a third RS flip-flop, for receiving said second set signal and said second reset signal at a set terminal and a reset terminal thereof, respectively, and outputting said second control signal at a non-inverting output terminal thereof.

10. The SIDO power converter of claim 9, wherein said SIDO power converter is operable in a voltage control mode.

11. The SIDO power converter of claim 9, wherein said clock adjustment circuit adjusts said phase difference between said first reference clock signal and said second reference clock signal so as to generate said first output clock signal and said second output clock signal with a phase difference larger than 180 degrees when said difference value is larger than zero, and said clock adjustment circuit adjusts said phase difference between said first reference clock signal and said second reference clock signal so as to generate said first output clock signal and said second output clock signal with a phase difference smaller than 180 degrees when said difference value is smaller than zero.

12. The SIDO power converter of claim 9, wherein said comparison circuit comprises:

a first comparator, for receiving said ramp waveform and said first load value at a non-inverting input terminal and an inverting input terminal thereof, respectively, and outputting said first compared signal being true at an output terminal thereof when said ramp waveform is larger than said first load value; and a second comparator, for receiving said ramp waveform and said second load value at a non-inverting input terminal and an inverting input terminal thereof, respectively, and outputting said second compared signal being true at an output terminal thereof when said ramp waveform is larger than said second load value.

13. The SIDO power converter of claim 9, wherein said current sensing circuit is coupled to two terminals of each of two resistors connected in series with said first switching transistor and said second switching transistor, respectively, to sense a value of a voltage across one of said two resistors connected in series with said second switching transistor to acquire said first sensed value when said first switching transistor is turned off and said second switching transistor is turned on and a value of a voltage across the other of said two resistors connected in series with said first switching transistor to acquire said second sensed value when said first switching transistor is turned on and said second switching transistor is turned off.

14. A method for controlling a SIDO power converter operable in a discontinuous conduction mode, said SIDO power converter comprising an output circuit, an error amplifier circuit, a current sensing circuit, a constant-frequency clock generator circuit, a clock adjustment circuit and a PWM logic control circuit, said output circuit comprising a first output terminal and a second output terminal for outputting a first output voltage and a second output voltage, respectively, an inductor, a first switching transistor and a second switching transistor, said first switching transistor and said second switching transistor being controlled by a first control signal and a second control signal, respectively, to determine whether said first switching transistor and said second switching transistor are turned on or off so as to generate said first output voltage and said second output voltage, said method comprising:

comparing, by said error amplifier circuit, said first output voltage and said second output voltage, respectively, with a first reference voltage and a second reference voltage so as to generate a first load value and a second load value;

acquiring, by said current sensing circuit, an inductor current as a first sensed value when said first switching transistor is turned on and said second switching transistor is turned off and an inductor current as a second sensed value when said first switching transistor is turned off and said second switching transistor is turned on;

generating, by said constant-frequency clock generator circuit, a first reference clock signal and a second reference clock signal with a constant phase difference of 180 degrees therebetween;

determining, by said clock adjustment circuit, whether said first reference clock signal and said second reference clock signal are to be adjusted according to a difference value between said first sensed value and said second sensed value so as to generate a first output clock signal and a second output clock signal; and generating, by said PWM logic control circuit, said first control signal and said second control signal, respectively, according to said first load value, said second load value, said first output clock signal, said second output clock signal and a ramp waveform based on an internal clock so as to control said first switching transistor and said second switching transistor to be turned on or off;

wherein said PWM logic control circuit comprises:

a comparison circuit, being coupled to said error amplifier circuit, for generating a first compared signal and a second compared signal, respectively, according to said first load value, said second load value and said ramp waveform; and a control circuit, being coupled to said comparison circuit, said clock adjustment circuit and said output circuit, for generating said first control signal and said second control signal, respectively, according to said first output clock signal, said second output clock signal, said first compared signal and said second compared signal;

wherein said control circuit comprises:

a first RS flip-flop, for receiving said first output clock signal and said second output clock signal at a set terminal and a reset terminal thereof, respectively;

a first OR gate, for generating a first set signal according to said first output clock signal and said second output clock signal;

a first AND gate, for generating a first reset signal according to said first compared signal and a signal outputted by a non-inverting output terminal of said first RS flip-flop;

a second RS flip-flop, for receiving said first set signal and said first reset signal at a set terminal and a reset terminal thereof, respectively, and outputting said first control signal at a non-inverting output terminal thereof;

a second OR gate, for generating a second set signal according to said first output clock signal and said second output clock signal;

a second AND gate, for generating a second reset signal according to said second compared signal and a signal outputted by an inverting output terminal of said first RS flip-flop; and a third RS flip-flop, for receiving said second set signal and said second reset signal at a set terminal and a reset terminal thereof, respectively, and outputting said second control signal at a non-inverting output terminal thereof.

15. The method of claim 14, wherein said SIDO power converter is operable in a voltage control mode.

16. The method of claim 14, wherein said clock adjustment circuit adjusts said phase difference between said first reference clock signal and said second reference clock signal so as to generate said first output clock signal and said second output clock signal with a phase difference larger than 180 degrees when said difference value is larger than zero, and said clock adjustment circuit adjusts said phase difference between said first reference clock signal and said second reference clock signal so as to generate said first output clock signal and said second output clock signal with a phase difference smaller than 180 degrees when said difference value is smaller than zero.

* * * * *